(No Model.)
2 Sheets—Sheet 1.
N. POULSON.
APPARATUS FOR MAKING PLATES OR PANELS FROM PLASTIC MATERIAL.
No. 550,133.  Patented Nov. 19, 1895.
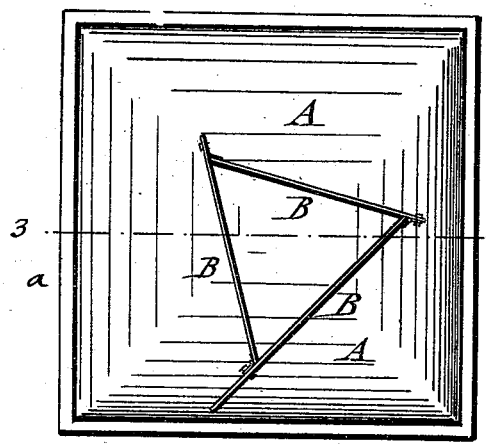
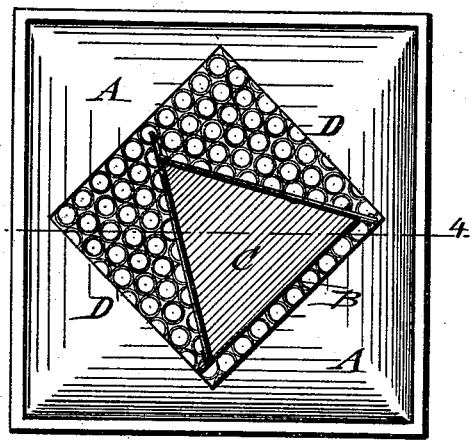
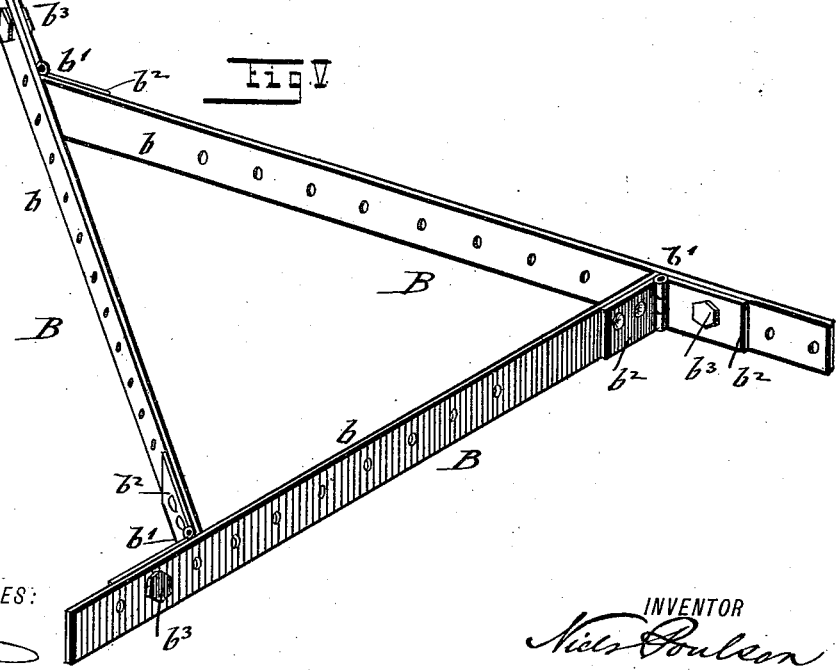
WITNESSES:
INVENTOR
BY
ATTORNEYS.

(No Model.) 2 Sheets—Sheet 2.
N. POULSON.
APPARATUS FOR MAKING PLATES OR PANELS FROM PLASTIC MATERIAL.
No. 550,133. Patented Nov. 19, 1895.
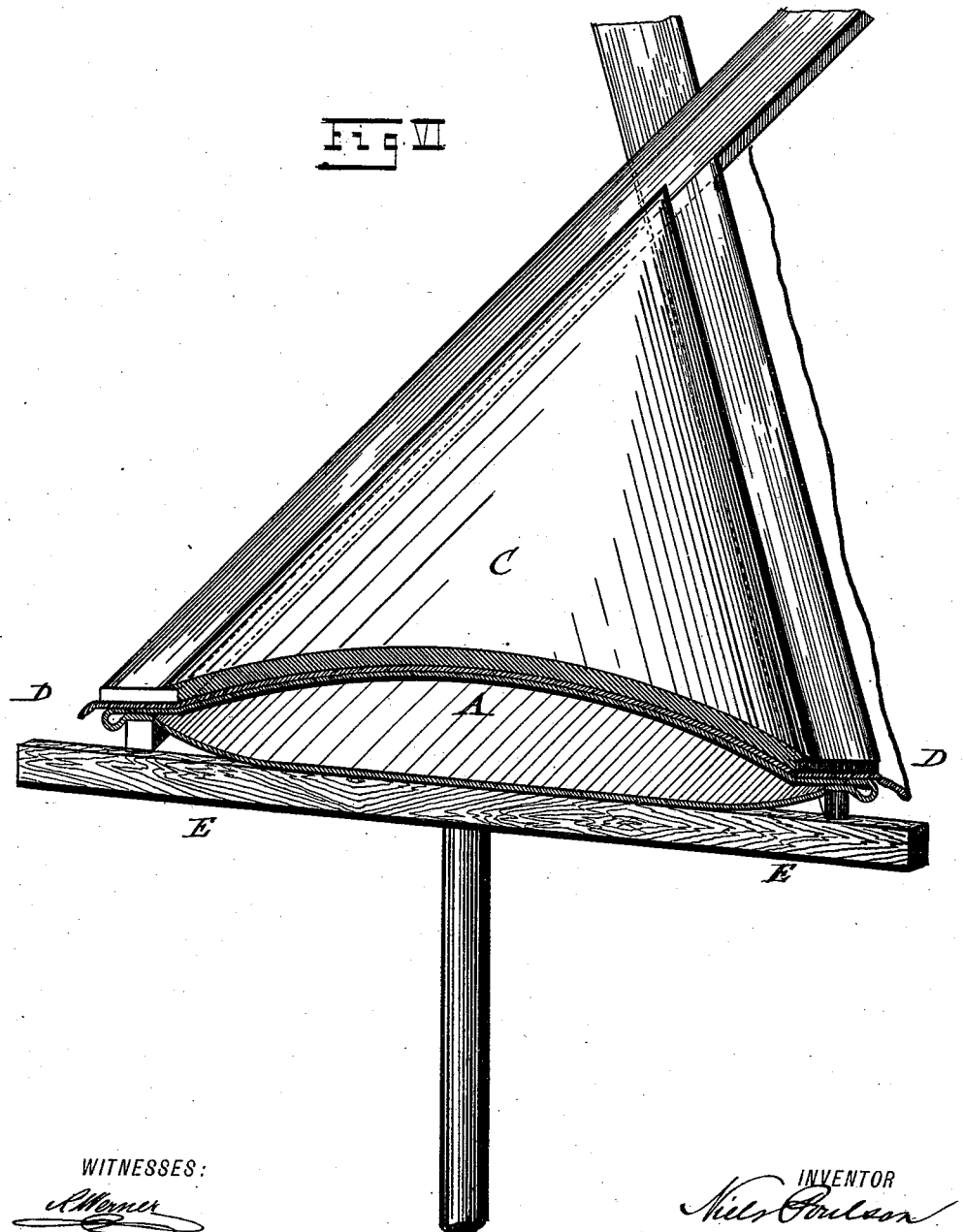

UNITED STATES PATENT OFFICE.

NIELS POULSON, OF FORT HAMILTON, NEW YORK.

APPARATUS FOR MAKING PLATES OR PANELS FROM PLASTIC MATERIAL.

SPECIFICATION forming part of Letters Patent No. 550,133, dated November 19, 1895.

Application filed April 10, 1891. Serial No. 388,408. (No model.)

*To all whom it may concern:*

Be it known that I, NIELS POULSON, a citizen of the United States of America, residing at the town of Fort Hamilton, in the county of Kings and State of New York, have invented certain new and useful Improvements in Apparatus for Making Plates or Panels from Plastic Material, of which the following is a specification.

This invention relates to an improved apparatus for making panels or plates from plaster-of-paris or other plastic material in such a manner that an arched form is imparted to the same while in course of formation, and also any suitable design or ornamentation formed on the surface of the same.

The invention consists, further, of an apparatus for making panels or plates from plastic material which comprises a convexly curved or arched yielding surface formed of an inflated rubber cushion, a frame corresponding to the shape of the panel to be produced, and a mold in intaglio made of elastic material and interposed between the yielding foundation and the frame, all as will be fully described hereinafter, and finally pointed out in the claims.

In the accompanying drawings, Figures 1 and 2 represent top views of two different forms of apparatus by which my improved process of producing panels or plates from plastic material is carried out. Figs. 3 and 4 are vertical transverse sections of the same, respectively, on lines 3 3, Fig. 1, and 4 4, Fig. 2. Fig. 5 is a perspective view of the adjustable frame for producing the ornamented panels or plates, drawn on a larger scale; and Fig. 6 is a sectional perpective view showing the apparatus applied to the supporting framework of a ceiling for making the panels or plates directly on the same.

Similar letters of reference indicate corresponding parts.

Referring to the drawings, A represents an air-cushion, which is mounted in a suitable frame $a$ and formed of rubber cloth or other elastic material. The cushion is provided with a valved mouthpiece in the same manner as in the well-known inflatable rubber bags. The air-cushion A can be inflated so as to form convexly-curved surfaces, having a curvature of greater or less radius, according to the degree of curvature that is to be imparted to the panels or plates formed on the convex mold-surface of the air-cushion. By this adjustment of the air-cushion a mold can be adapted to the molding of plates of different degrees of curvature.

In place of an air-cushion, to which any desired degree of curvature may be imparted, a number of stuffed cushions may be used, which cushions are also made of yielding material, but of which each has a different degree of curvature, which cushions, however, are very convenient when large numbers of building plates or panels having the same degree of concavity have to be produced.

The convexly-curved yielding mold-surface of the cushion A forms the foundation on which the concaved building plates or panels are formed. On the cushion A is placed a frame B, that is formed of a number of metallic and perforated strips $b$, which are either straight or curved so as to correspond to the curvature of the plates to be produced, and which are united by hinge-joints $b'$, the leaves $b^2$ of which are attached to the perforations of the strips $b$ by means of screw-nuts $b^3$, as shown clearly in Fig. 5. By the hinge-joint $b'$ and connecting-screws plates of any desired size and shape may be produced, triangular plates being formed when three strips are used, while plates having four or more sides are obtained when the frame is made of four or more sides.

The frame B is pressed in a suitable manner, either by different sizes of weights or by braces, on the yielding mold-surface of the cushion A, so that a convexity differing from the original convex surface for the mold-surface is obtained, and then a layer C of plaster-of-paris or other suitable plastic material, is run into the frame and permitted to set. The concavity of this plate or layer C corresponds to the convex surface of the cushion A. When the material has set sufficiently, the panel formed by the plastic material is removed from the frame by loosening the screws of the latter, upon which the plate or panel can be readily loosened from the frame by one or more taps on the back of the panel. The panel is now ready to be placed in position for use. When it is desired to produce the face of the plates or panels in ornamental designs, the yielding mold-surface of the cushion is either made of a molded rubber or gelatine layer D, in which the desired design is produced in intaglio, which is readily obtained from an original pattern-plate in the usual manner, or it may be placed as an intermediate layer on the cushion between it and the frame into which the plastic material is cast, so that the panels receive the ornamental surface at the same time when casting them. The molded elastic layer D is shown in Figs. 2 and 4.

Instead of casting the plates or panels ready to be used in building up the ceilings or other part of a building the plates or panels can also be cast directly at the place where they are required by placing the convex yielding mold-surface of the cushion A against the iron ribs of the metallic framework which supports the ceiling, in which case the ribs of the supporting structure take the place of the frame B before described and permit thereby the casting of the filling plates or panels *in loco*. In this case a supporting-frame E is placed below the elastic cushion and pressed tightly against the ribs, which press on the upper part of the cushion, as shown in Fig. 6. The supporting-frame is then braced in position, so that the convex yielding surface is also held in position. By this method plates having a curvature corresponding to the curvature of the supporting iron framework of the ceiling are produced in which each panel has its own arched shape, whereby the ornamental effect produced is considerably enhanced, while plain or highly-ornamented ceilings can be produced at a comparatively small expense.

Having thus described my invention, I claim as new and desire to secure by Letters Patent—

1. The apparatus herein described for making concaved panels or plates of plastic material, which consists of a convexly-curved yielding mold-surface and a frame of the size and shape of the panel or plate to be produced on said mold-surface, substantially as set forth.

2. The combination, with a convexly-curved yielding mold-surface, of a frame of the size and shape of the panel or plate to be produced, the frame being formed of perforated sides hinged together and means for adjustably connecting said sides, substantially as set forth.

3. A frame for producing panels or plates from plastic material, formed of perforated strips, hinge-joints connecting said strips, and adjusting screws for the leaves of the hinges, substantially as set forth.

In testimony that I claim the foregoing as my invention I have signed my name in presence of two subscribing witnesses.

NIELS POULSON.

Witnesses:
PAUL GOEPEL,
A. M. BAKER.